Jan. 21, 1941.   R. H. BARNARD   2,229,489
METHOD AND APPARATUS FOR MAKING GLASS WOOL
Filed June 14, 1939   2 Sheets-Sheet 1

INVENTOR.
Randolph H. Barnard
BY Barnes, Kisselle, Laughlin & Raisch
ATTORNEYS

Jan. 21, 1941.   R. H. BARNARD   2,229,489
METHOD AND APPARATUS FOR MAKING GLASS WOOL
Filed June 14, 1939   2 Sheets-Sheet 2

INVENTOR.
Randolph H. Barnard
BY Barnes, Kisselle, Laughlin & Keuch
ATTORNEYS

Patented Jan. 21, 1941

2,229,489

UNITED STATES PATENT OFFICE 2,229,489

METHOD AND APPARATUS FOR MAKING GLASS WOOL

Randolph H. Barnard, Toledo, Ohio

Application June 14, 1939, Serial No. 279,146

16 Claims. (Cl. 49—1)

This invention relates to the making of what is commonly termed "glass wool," that is to say, a body comprising fine fibrous-like strands of glass disposed or accumulated in a mass which may be in the nature of a mat or bat. It is within the scope of the invention, insofar as forming the mass of fibers into a body is concerned, that the fibrous strands may be accumulated at random or formed in any predetermined or substantially uniform manner.

The principal object of the invention is the provision of a method and apparatus for making glass wool from a source of glass supply in the nature of a long length of glass such as a tube, rod or strip. Such tube, rod or strip may be of indefinite length or may be composed of succeeding separate lengths fed into the apparatus, and, indeed, preferably, the rod or strip or tube employed in the making of the glass wool may be formed or caused to issue from a molten glass supply and be fed directly in a continuous manner to the apparatus which forms the glass wool.

Another object of the invention is to provide a method and apparatus for carrying out the invention wherein a simple form of apparatus may be used and wherein the method may be carried out in a continuous manner. By this is meant that the method may be performed over indefinite periods of time.

Another object of the invention is that of controlling the size of the strands of the glass wool so that the fineness or coarseness may be regulated. This can be varied within the scope of the invention, but ordinarily the control is arranged so that the size or fineness of the strands are of uniform nature. The invention contemplates a method and arrangement of apparatus for accomplishing this control automatically in the course of the making of the glass wool. These and other objects will become more apparent as the detailed description is considered in conjunction with the accompanying drawings.

Fig. 5 is a cross sectional view taken substantially on line 5—5 of Fig. 1 showing the light sensitive element used in conjunction with controlling glass wool strands.

Figure 1:
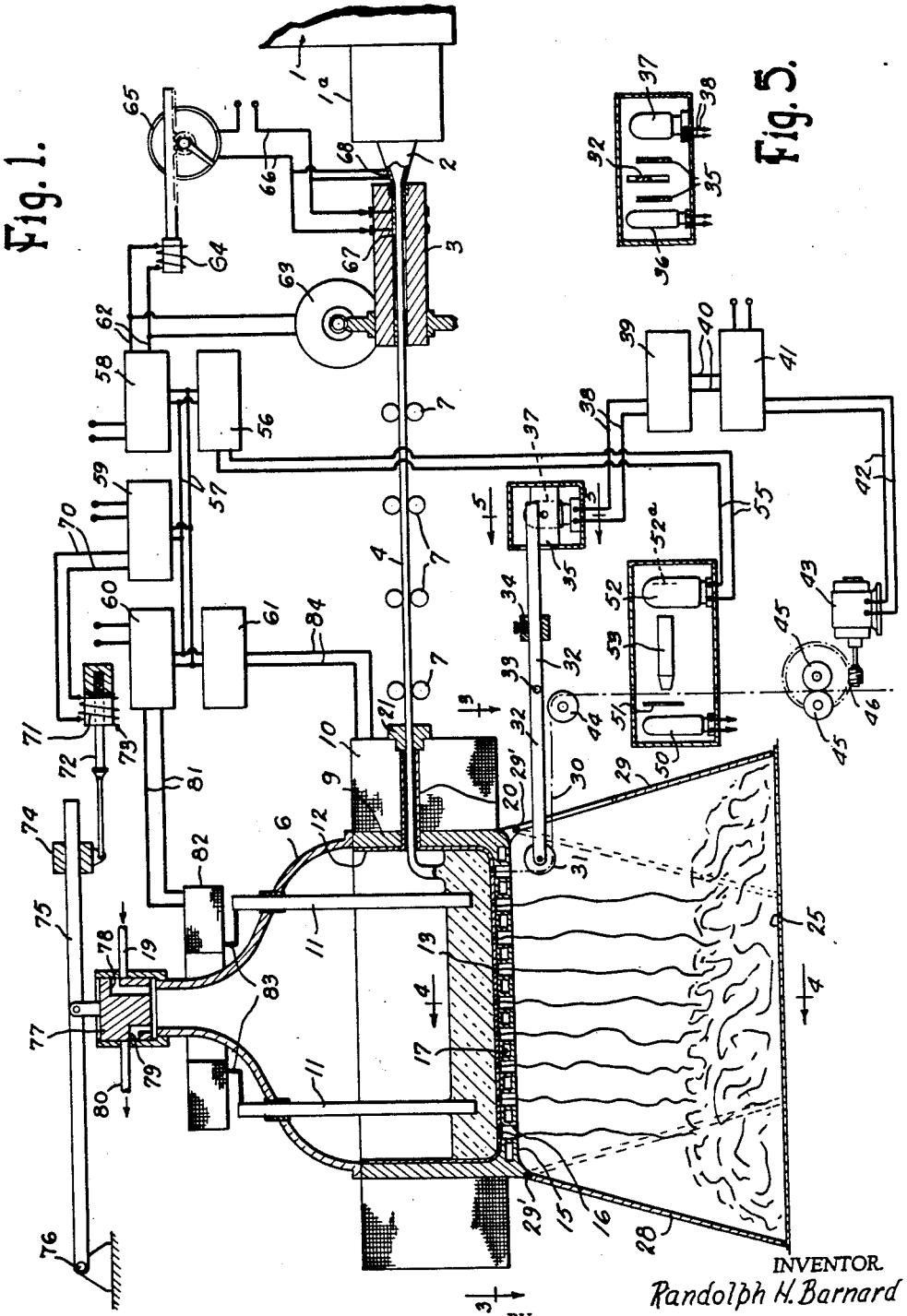
Fig. 1 is a rather diagrammatic view illustrating the method and apparatus showing the various controls and showing some of the parts in cross section.
Figure 2:
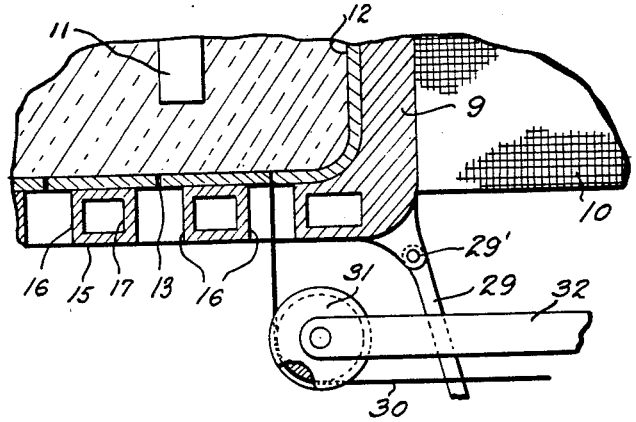
Fig. 2 is an enlarged detailed view in section showing some of the structure of the pot for the molten glass.
Figure 3:
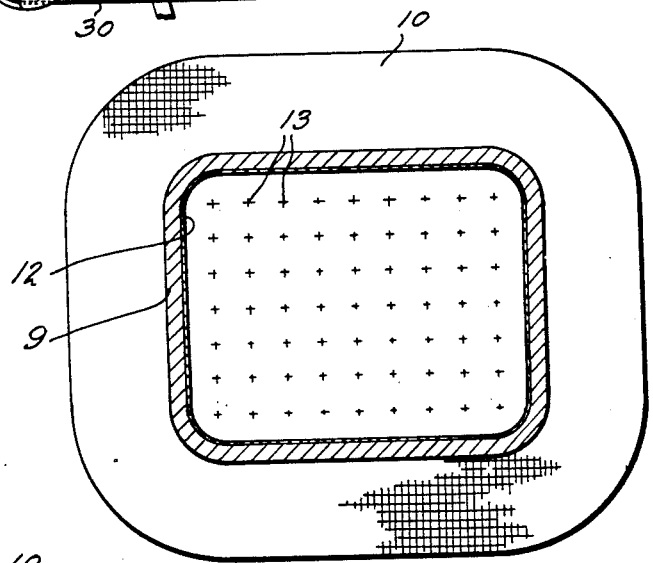
Fig. 3 is a horizontal cross-sectional view taken substantially on line 3—3 of Fig. 1.

The supply of glass from which the glass wool is made may advantageously be provided continuously by the issuance of the glass in strip, tube or rod form from an apparatus for providing glass in such form from a molten supply. Such an apparatus may take the form of that in my Patent No. 2,150,017 of March 7, 1939. Such an apparatus is generally illustrated in Fig. 1, although not shown in detail. Suffice it to say that a pot or retainer for molten glass is illustrated at 1, having a spout or outlet 2 from which the glass is caused to issue. In the present showing this glass is in the form of a rod, as shown at 4. Surrounding the rod or glass adjacent the outlet is a bushing 3 which, as set forth in said patent, may be arranged to control the size of the rod. The pot or retainer 1 may be directly connected to the forebay 1a of a glass furnace so that molten glass is supplied thereto, while molten glass may also be used from this same furnace in the making of other glassware, such, for example, as tumblers or the like, or other pressed ware.

The apparatus for forming the glass wool takes the form of a closed chamber or pot 6 into which the rod 4 is fed, and the rod may be supported by supporting devices or rollers 7. The rollers may be driven to feed the glass rod lengthwise. Within the chamber the glass rod is rendered molten by the application of heat. As shown herein, the pot 6 has a body portion 9 surrounded by a high frequency inductance coil 10. The portion of the pot which contains the mass of molten metal is preferably lined with a suitable material such as a platinum alloy, and more particularly platinum rhodium having a high melting point and having its bottom provided with a multiplicity of small apertures. This lining is illustrated at 12, while the apertures in the bottom are shown at 13. These, of course, will be very small apertures and are not necessarily shown to size in any of the views of the drawings. In order to support the bottom of the liner, the pot has a bottom portion 15 provided with apertures 16 which line up with apertures 13. The bottom portion may be of cored formation to provide passageways 17 for a cooling fluid.

The surface of the body of molten glass within the container is subjected to a suitable pressure, preferably fluid pressure, which may be obtained by compressed gas or steam and passed into the container, as for example, through a conduit 19.

The glass in the pot 6 is heated and rendered molten by heat imparted thereto from the pot itself. The metal portions of the pot are heated by electrical inductance and the heat in turn is thus transferred to the glass. The body 9 of the vessel may be of suitable metal with an adequately high melting point so that both the body and the liner 12 may be heated by the inductance coil. On the other hand, the body portion 9 may be a dielectric, such as a ceramic substance, in which event only the liner is heated by electrical inductance.

The molten glass may also be heated by means of electrodes 11 immersed in the molten glass for the passage of a current, preferably of low voltage and high amperage, through the glass.

In the operation of the apparatus, the glass rod, or strip is fed into the pot, rendered molten, and the pressure inside the vessel causes the molten glass to pass downwardly in streams through the multiplicity of apertures 13. The rate of movement of the glass rod into the vessel and the rate of discharge of the fibrous-like strands of glass through the bottom of the vessel will be coordinated with each other to maintain a suitable volume or body of molten glass within the vessel, and in this connection the pressure in the vessel is also a factor to be considered. For maintaining the pressure in the vessel a tube 20 having a sealed connection with the vessel may pass through the coil 10 for the passage of glass rod therethrough, and this tube may carry at its outer end a sealing element 21 which engages the glass rod with a sufficient sealing action to maintain the pressure within the vessel.

Figure 4:
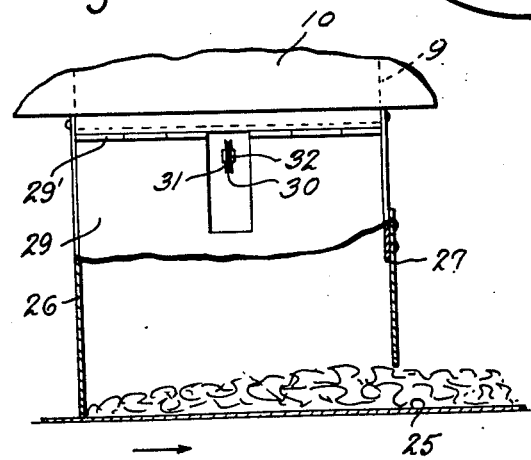
Fig. 4 is a sectional view taken substantially on line 4—4 of Fig. 1.

The body of glass wool may be collected on a suitable support or the like 25 such as paper, and may be built up to the desired dimensions. In this connection the sheet of material 25 may be of the moving type with movement from left to right as Fig. 4 is viewed. The space between the pot and the receiving material 25 is preferably a confined area. For this purpose there is a wall member 26 adjacent the on-coming side of the material 25 and an opposite wall member 27. The member 27 may be vertically adjustable to correspond to the thickness of the mat of glass wool. Two other wall members disposed at right angles to those shown in Fig. 4 are illustrated at 28 and 29, and these are preferably movably mounted, as for example, on hinges 29'. These partitions may be adjusted to determine the width of the mat or body of glass wool which is formed.

The element 25 may, if desired, merely be a receiving device for the glass wool, or, on the other hand, it may form a portion of a permanent retainer for the mat or bat of glass wool, in which event the material 25 may be treated with a suitable adhesive so that the mat adheres thereto. In carrying out the process, one or more rods such as the glass rod 4 may be fed into the vessel 6, this provision, of course, depending upon such factors as the capacity of the flow of glass wool through the bottom of the vessel and the volume of glass which can be supplied by the rods, as well also as the capacity to melt the rods. The rods, strips or tube provide a glass body of relatively small cross dimensions so that the glass may be rendered molten with considerable facility.

The features of control reside in the control of some or all of various factors, such as the pressure within the chamber 6, the temperature of the glass within the chamber 6, the size or speed of movement of the glass strip or rod, in conjunction with the maintenance or control of the size of the glass wool strands. To this end one of the strands, as illustrated at 30, is passed over a grooved roller 31 mounted on a rocker arm 32 pivoted as at 33. The rocker arm may carry a balance weight 34. As illustrated in Fig. 5, a portion of the rocker arm 32 is arranged to move between two apertured shields 35 between a light source 36 and a light sensitive element 37. Conductors 38 extend from the light sensitive element to an amplifier 39 which is connected by conductors 40 to a current control device 41 for controlling, through conductors 42, the operation of an electric motor 43. The strand 30 passes over a guide roll 44 and between pulling rolls 45 driven by the motor 43 through the worm and gear arrangement 46. If the strand 30 becomes loose the rocker arm 32 pivots to expose the light sensitive element 37 to the light 36 which, through the amplifier and control, increases the speed of the motor 43, thus to maintain the run of glass between the roller 44 and the rollers 45 taut. Conversely, if the motor 43 is running a little too fast, that is, exceeds the rate or flow of extrusion of the glass strand from the vessel 6, the rocker arm 32 is pivoted so that it intercepts the light from the source 36, and the motor 43 is caused to decelerate.

Figure 6:
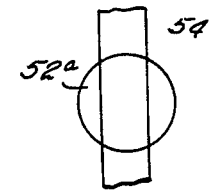
Fig. 6 is an enlarged view illustrating how the image of a glass wool strand may be concentrated on a light sensitive element in the control of the apparatus.

The strand of glass is acted upon to control various other factors. A light source 50 casts light on a screen such as ground glass 51. The shadow of the strand is concentrated upon the light sensitive element 52 preferably through the means of a lens 53. This shadow is indicated at 54 in Fig. 6 showing its relation to the light sensitive plate 52a of the element 52. Variation in the extent of the shadow causes variation in the current and conductors 55 extending to an amplifier 56. This amplifier is connected by conductors 57 to a motor current control device 58, a second control device 59 for controlling the pressure, a third control 60 for controlling the current for the electrodes, and, if desired, to a fourth control 61 for controlling the current to the high frequency coil 10. Conductors 62 extend to a motor 63 for controlling the rotation of the sleeve 3, and a solenoid 64 may also be regulated by the current in the conductors 62 for varying a rheostat 65 in turn controlling the current in conductors 66 for heating the glass at the spout 2 and in the sleeve 3. The conductors 66 lead, as shown, to suitable heating elements 67 and 68 in the sleeve and spout.

Conductors 70 supply current to a coil 71 for acting upon the armature 72 of a solenoid 73 varying a counter-balancing weight 74 on an arm 75 pivotally mounted as at 76 and connected to the pressure controlling valve 77. This valve has an inlet passageway 78 and an outlet passageway 79 leading to an exhaust 80. The control 60 has conductors 81 leading to a transformer 82 for controlling the circuit in the secondary 83 for the electrodes 11. The control 61 has conductors 84 which lead to the inductance coil.

With this arrangement the strand of glass between the rollers 44 and 45 is maintained taut and its shadow is cast upon the light sensitive element 52a. If the shadow becomes too small, the volume of glass extruded may be increased. This is accomplished by one or more of the various controls. The control 58 may function to govern the motor 63 and the heating devices 67 and 68 to increase the volume of glass in the rod or strip. The control 59 may function to increase the pressure in the vessel. In this connection it will be noted that the valve 77 is acted upon by the pressure, and the action is variable, depending upon the position of the counter-weight 74. If the valve is lowered from the position illustrated, compressed gas is caused to enter the vessel. If it is raised the exhaust is opened to relieve the pressure. To increase the volume of extruded glass, the pressure may be increased, and this may be done by causing the solenoid to shift the counter-weight 74 away from the fulcrum so that the valve member lowers to open the pressure inlet. The control 60 may vary the current for the electrodes. The control 61 may vary the current for the inductance coil. These several controls, or any one or more of them, can be combined and so regulated and coordinated as to maintain the desired level of molten glass within the vessel 6, and to govern the rate or volume of the extruded glass to thus maintain or control the size of the strands. Once the machine is set in operation, the adjusted condition is maintained automatically.

In the claims appended hereto the word "strip" is employed in reference to the supply of glass, and this is intended to cover glass in the form of a tube, a rod, or a flat strip, or a long length of glass of any cross section or shape. Also, in some of the claims, a gas or gaseous pressure is specified, and this term is also to include steam.

I claim:

1. The method of making glass wool which comprises feeding a glass strip substantially continuously into a heating chamber having a multiplicity of apertures in one of its walls, melting the glass strip in the chamber to provide a body of molten glass therein, applying gaseous pressure to said body of molten glass to cause the same to be extruded through said apertures, and coordinating the volume of movement of the glass strip into the chamber and the rate of extrusion of the glass through the apertures to maintain a body of molten glass in the chamber.

2. The method of making glass wool which comprises forming a glass strip from a supply of molten glass and moving the strip longitudinally, passing the strip substantially continuously into a chamber having a multiplicity of apertures in one of its walls, melting the strip in the chamber to provide a body of molten glass therein, and applying gaseous pressure to the body of molten glass in said chamber to cause the glass to be extruded through said apertures.

3. The method of making glass wool which comprises feeding a glass strip with substantially continuous movement into a closed heating chamber having a multiplicity of apertures in one of its walls, melting the strip within the chamber from heat derived from a metallic substance in turn heated by electrical induction to provide a body of molten glass within the chamber and applying gaseous pressure to the body of molten glass within the chamber to cause the glass to be extruded through said apertures.

4. An apparatus for making glass wool which comprises, a closed vessel having a multiplicity of apertures in its bottom wall, means for feeding glass strip into the vessel, means for heating and melting the glass strip and for maintaining a body of molten glass in the vessel, and means for introducing gaseous pressure into the vessel above the body of molten glass to cause the same to flow through said multiplicity of apertures.

5. An apparatus for making glass wool comprising in combination, means for forming a glass strip from a supply of molten glass and for moving said strip longitudinally, a substantially closed vessel having a multiplicity of apertures in one of its walls and into which said strip is moved, means for heating and melting the glass strip within the vessel and for maintaining a body of molten glass in the vessel, and means for introducing gaseous pressure into the vessel to cause the glass to flow through said multiplicity of apertures.

6. An apparatus for making glass wool comprising in combination, means for forming a glass strip from a supply of molten glass and for moving said strip longitudinally, a substantially closed vessel having a multiplicity of apertures in one of its walls and into which said strip is moved, means for heating and melting the glass strip within the vessel, and for maintaining a body of molten glass in the vessel, and means for introducing gaseous pressure into the vessel to cause the glass to flow through said multiplicity of apertures, said heating means comprising an inductance coil, and said vessel including a metallic part heated thereby and in turn melting the glass.

7. The method of making glass wool which comprises feeding glass strip substantially continuously into a heating chamber having a multiplicity of apertures in one of its walls, applying heat to melt the strip to provide a body of molten glass in the chamber, applying gaseous pressure to the body of molten glass to cause the same to be extruded through the apertures in the form of strands, and varying such factors as the pressure, the applied heat and the volume of glass introduced through the means of the strip to control the dimensions of the strands.

8. The method of making glass wool which comprises feeding glass strip substantially continuously into a heating chamber having a multiplicity of apertures in one of its walls, applying heat to melt the strip to provide a body of molten glass in the chamber, applying pressure to the body of molten glass to cause the same to be extruded through the apertures in the form of strands, segregating one of the strands of extruded glass, gauging the cross dimension thereof and varying such factors as the pressure, applied heat and volume of glass introduced from the strip, in accordance with variations in the cross dimension of the segregated strand.

9. In the method of making glass wool, heating the glass to a molten condition, extruding the glass under pressure through a multiplicity of apertures in the form of strands, segregating one strand, gauging the cross dimension of said one strand and varying such factors as the molten condition of the glass and the rate of extrusion in accordance with variations in the cross dimension of the gauged segregated strand.

10. In the method of making glass wool, heating the glass to a molten condition, extruding the glass under pressure through a multiplicity of apertures in the form of strands, segregating one strand, maintaining a portion of the segregated strand taut, gauging the cross dimension of the taut portion of said strand and varying such factors as the condition of the molten glass and the rate of extrusion in accordance with variations in the cross dimension of said strand.

11. The method of making glass wool which comprises causing molten glass to flow through a multiplicity of apertures in the form of strands, gauging one of the strands particularly as to its cross dimension and varying the flow of the molten glass through the apertures in accordance with variations in the cross dimension of the said strand whereby to substantially maintain uniformity in the cross dimensions of the strands.

12. An apparatus for making glass wool comprising in combination, a receptacle for molten glass, means for heating the glass to maintain the molten condition, means for applying pressure to the glass within the receptacle, said receptacle having a multiplicity of apertures for the extrusion of the glass therefrom incident to the pressure, means for gauging at least one of the extruded strands, and means operable by the gauging means for varying the pressure applied to the glass.

13. An apparatus for making glass wool comprising in combination, a receptacle for molten glass, means for heating the glass to maintain the molten condition, means for applying pressure to the glass within the receptacle, said receptacle having a multiplicity of apertures for the extrusion of the glass therefrom incident to the pressure, means for gauging at least one of the extruded strands, and means operable by the gauging means for varying the heat applied for the maintenance of the molten glass and for varying the pressure applied to the glass to control the thickness of the strands.

14. An apparatus for making glass wool, comprising in combination, a closed receptacle having a multiplicity of apertures in its bottom, means for forming a glass strip from a supply of molten glass and for feeding the glass strip into the receptacle, means for melting the glass strip in the receptacle to maintain a body of molten glass therein, means for applying pressure to the glass within the receptacle for the extrusion of the glass through the apertures, means for segregating one of the glass strands, means for gauging the segregated strand, and means operable by the gauging means to vary such factors as the volume of glass in the strip, the pressure applied to the glass and the heat applied for melting the strip in the receptacle.

15. An apparatus for making glass wool comprising in combination, a closed receptacle having a multiplicity of apertures in its bottom, means for heating and maintaining a supply of molten glass in the receptacle, means supplying pressure on the glass for the flow of the glass through the apertures in the form of a multiplicity of strands, means for segregating one of the strands, gauging means including a light sensitive element for gauging said segregated strand, and means operable by the gauging means for varying the rate of flow of the glass through the apertures substantially in accordance with variations in the dimension of the gauged segregated strand.

16. An apparatus for making glass wool comprising in combination, a closed receptacle having a multiplicity of apertures in its bottom, means for heating and maintaining a supply of molten glass in the receptacle, means for applying pressure on the glass for the flow of the glass through the apertures in the form of a multiplicity of strands, means for segregating one of the strands, means for maintaining a portion of the segregated strand in taut condition, gauging means including a light sensitive element for gauging the taut portion of said segregated strand, and means operable by the gauging means for varying the rate of flow of the glass through the apertures substantially in accordance with variations in the dimension of the gauged segregated strand.

RANDOLPH H. BARNARD.